United States Patent
Tong

(10) Patent No.: US 8,290,950 B2
(45) Date of Patent: Oct. 16, 2012

(54) IDENTIFYING LOCALE-SPECIFIC DATA BASED ON A TOTAL ORDERING OF SUPPORTED LOCALES

(75) Inventor: Bo-Ming Tong, Vancouver (CA)

(73) Assignee: SAP France S.A., Paris (FR)

( * ) Notice: Subject to any disclaimer, the term of this patent is extended or adjusted under 35 U.S.C. 154(b) by 642 days.

(21) Appl. No.: 12/023,599

(22) Filed: Jan. 31, 2008

(65) Prior Publication Data
US 2009/0198647 A1 Aug. 6, 2009

(51) Int. Cl.
G06F 17/30 (2006.01)
(52) U.S. Cl. .................................. 707/736; 707/758
(58) Field of Classification Search .............. 707/758, 707/736
See application file for complete search history.

(56) References Cited

U.S. PATENT DOCUMENTS

| | | | | |
|---|---|---|---|---|
| 5,440,615 | A * | 8/1995 | Caccuro et al. | 379/88.06 |
| 5,724,503 | A * | 3/1998 | Kleinman et al. | 719/318 |
| 6,623,529 | B1 * | 9/2003 | Lakritz | 715/205 |
| 2002/0174196 | A1 * | 11/2002 | Donohoe et al. | 709/219 |
| 2003/0212670 | A1 * | 11/2003 | Yalamanchi et al. | 707/3 |
| 2004/0194099 | A1 * | 9/2004 | Lamping et al. | 718/100 |
| 2005/0124316 | A1 * | 6/2005 | Islam et al. | 455/404.2 |
| 2006/0075035 | A1 * | 4/2006 | Tripp | 709/206 |

OTHER PUBLICATIONS

H. Alvestrand, "Tags for the Identification of Languages," Uninett, Mar. 1995, pp. 1-9.
H. Alvestrand, "Tags for the Identification of Languages," Cisco Systems, Jan. 2001, pp. 1-12.

* cited by examiner

*Primary Examiner* — Son T Hoang
(74) *Attorney, Agent, or Firm* — Mintz, Levin, Cohn, Ferris, Glovsky and Popeo, P.C.

(57) ABSTRACT

A computer readable storage medium includes executable instructions to extract a first language from a first target locale in response to failing to match the target locale to a list of supplied locales, where the list of supplied locales includes all supported locales for which locale-specific data is available. The computer readable storage medium further includes executable instructions to identify a substitute locale within the list of supplied locales based on a total ordering of all supported locales, where the substitute locale includes the first language if the list of supplied locales includes at least one locale within the first language.

19 Claims, 5 Drawing Sheets

IDENTIFYING LOCALE-SPECIFIC DATA BASED ON A TOTAL ORDERING OF SUPPORTED LOCALES

FIELD OF THE INVENTION

The present invention relates generally to data processing. More particularly, this invention relates to the identification of locale-specific data based on a total ordering of supported locales.

BACKGROUND OF THE INVENTION

Business Intelligence (BI) generally refers to software tools used to improve business enterprise decision-making. These tools are commonly applied to financial, human resource, marketing, sales, service provider, customer, and supplier analyses. More specifically, these tools can include reporting and analysis tools for presenting information, content delivery infrastructure systems for delivering and managing reports and analytics, and data warehousing systems for cleansing and consolidating information from disparate sources. BI tools may work with data management systems, such as relational databases or On Line Analytic Processing (OLAP) systems used to collect, store, and manage raw data.

BI tools can facilitate user productivity by enabling a user to view and work with data in the "best" language in which the information is available. Typically, this data is in a language desired by the user, and in a country desired by the user that is associated with the language. Versions of the same language spoken in different countries may vary substantially. For example, if an online news story were available in US English and Australian English, an American user would likely prefer to read the story in US English. This example illustrates that locale-specific data (in this case, the text of the story in US English) often refers to data associated with a language and a country, and that the corresponding locale (in this case, English-US) often refers to a language and a country.

FIG. 1 illustrates operations associated with finding locale-specific data, in accordance with the prior art. Locale-specific data is typically associated with a document, where a document is broadly defined to include any electronic collection of data, or a portion of any electronic collection of data. For example, a document may refer to a paragraph of text within a novel, or a text string, in electronic form. A computer system attempts to satisfy a locale preference indicated by a target locale. The target locale can refer to a language and a country desired by a user, and may be expressly requested by the user, or, for example, may be determined by a BI system based on the location and/or nationality of the user. The computer system attempts to match a target locale to a list of locales, where the target locale typically is a language and a country (block 100). The list of locales includes all locales in which locale-specific information is available for the document. If there is a match of the target locale to a locale in the list of locales (block 102), then the system retrieves locale-specific data corresponding to the target locale (block 104). If there is no match, then the system extracts the language from the target locale (block 106). The system then attempts to match a country-neutral locale with the language of the target locale to the list of locales (block 108). An example of a country-neutral locale is country-neutral English, which is English with no associated country. Country-neutral English is typically English that is "standard" by some measure, such as the English spoken by the highest percentage of English speakers worldwide. If there is a match of the country-neutral locale with the language of the target locale to a locale in the list of locales (block 110), then the system retrieves locale-specific data corresponding to the country-neutral locale with the language of the target locale (block 112). If not, the system then applies a default locale of the system (block 114). If there is locale-specific data for the document associated with the system default locale (block 116), then the system retrieves the locale-specific data (block 118). If not, then the system indicates that no locale-specific data is available for the document (block 120).

One problem with the prior art approach of FIG. 1 is that locale-specific data that is country-neutral is assumed to exist as a fallback locale to meet the language preference indicated by the target locale. Another, more significant problem is that locale-specific data in the system default locale is assumed to exist as a grand fallback, if there is no country-neutral locale with the language of the target locale. If the system default locale is US English, then this means that a translation of any non-US English document should be provided to or generated by the system of FIG. 1. This avoids the undesirable result (block 120) of returning no locale-specific data for a document even though locale-specific data that may be a reasonable substitute does exist for the document. For example, if a British user requests a British English version of a presentation that is available only in Australian English and Singaporean English, the system of FIG. 1 attempts to use country-neutral English as a fallback locale. The system of FIG. 1 thus fails to identify English-Australia or English-Singapore as a reasonable substitute locale for the British user, and also would fail to provide the Australian English or Singaporean English version of the presentation to the British user unless the system default locale were either English-Australia or English-Singapore.

The assumptions of the existence of a country-neutral fallback locale and a grand fallback may be reasonable when, for example, standard locale-specific data, such as data in country-neutral English, is provided by the system vendor for all documents used by the system of FIG. 1. However, these assumptions typically do not extend to a more general scenario where documents and their translations are provided by customers of the system vendor or users of the system. For example, it may be unreasonable to burden a user with providing an English translation of a non-English language document just to meet these restrictions on the operation of the system of FIG. 1. Moreover, the design of the system of FIG. 1 may be complicated by the need to store copies of all documents in the system default locale and to ensure the consistency of these copies with the original documents.

In view of the foregoing problems, it would be desirable to provide improved techniques for identifying locale-specific data.

SUMMARY OF THE INVENTION

This invention includes a computer readable storage medium with executable instructions to extract a first language from a first target locale in response to failing to match the target locale to a list of supplied locales, where the list of supplied locales includes all supported locales for which locale-specific data is available. The computer readable storage medium further includes executable instructions to identify a substitute locale within the list of supplied locales based on a total ordering of all supported locales, where the substitute locale includes the first language if the list of supplied locales includes at least one locale with the first language.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

The invention is operative with a data source. A data source is an information resource. Data sources include sources of data that enable data storage and retrieval. Data sources may include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources may also include a data source where the data is not stored like data streams, broadcast data, and the like.

Figure 1:
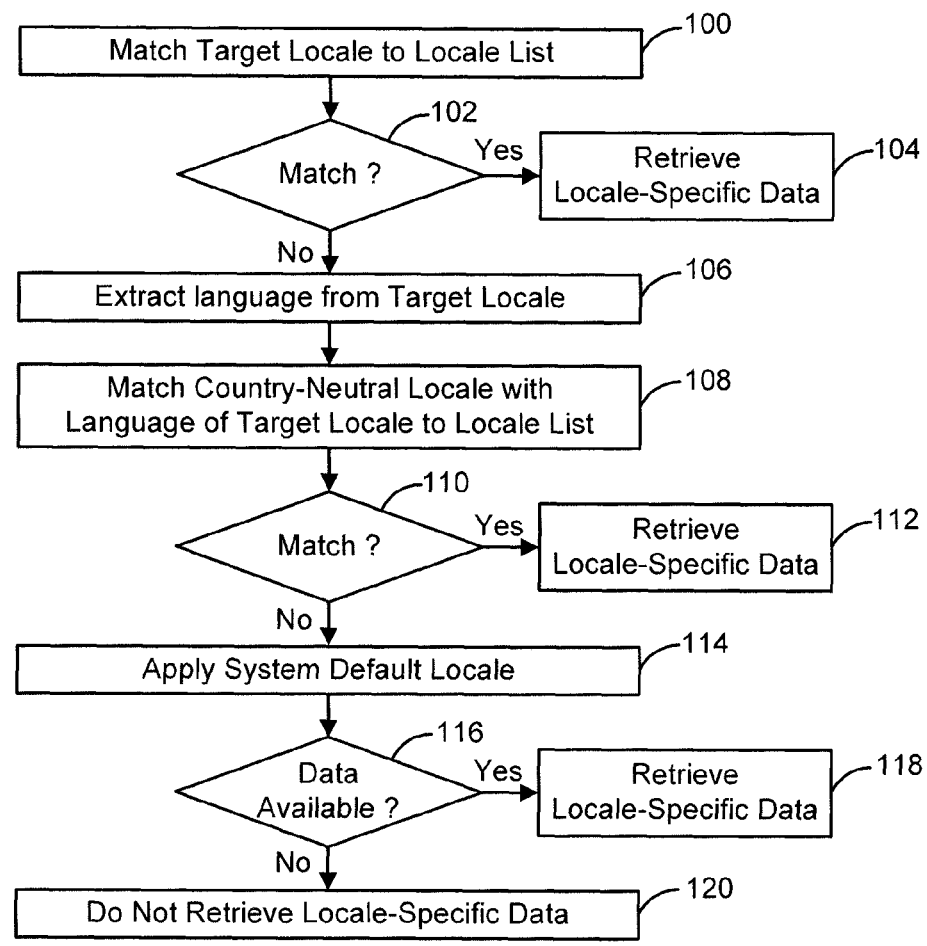
FIG. 1 illustrates operations associated with finding locale-specific data, in accordance with the prior art.
Figure 2:
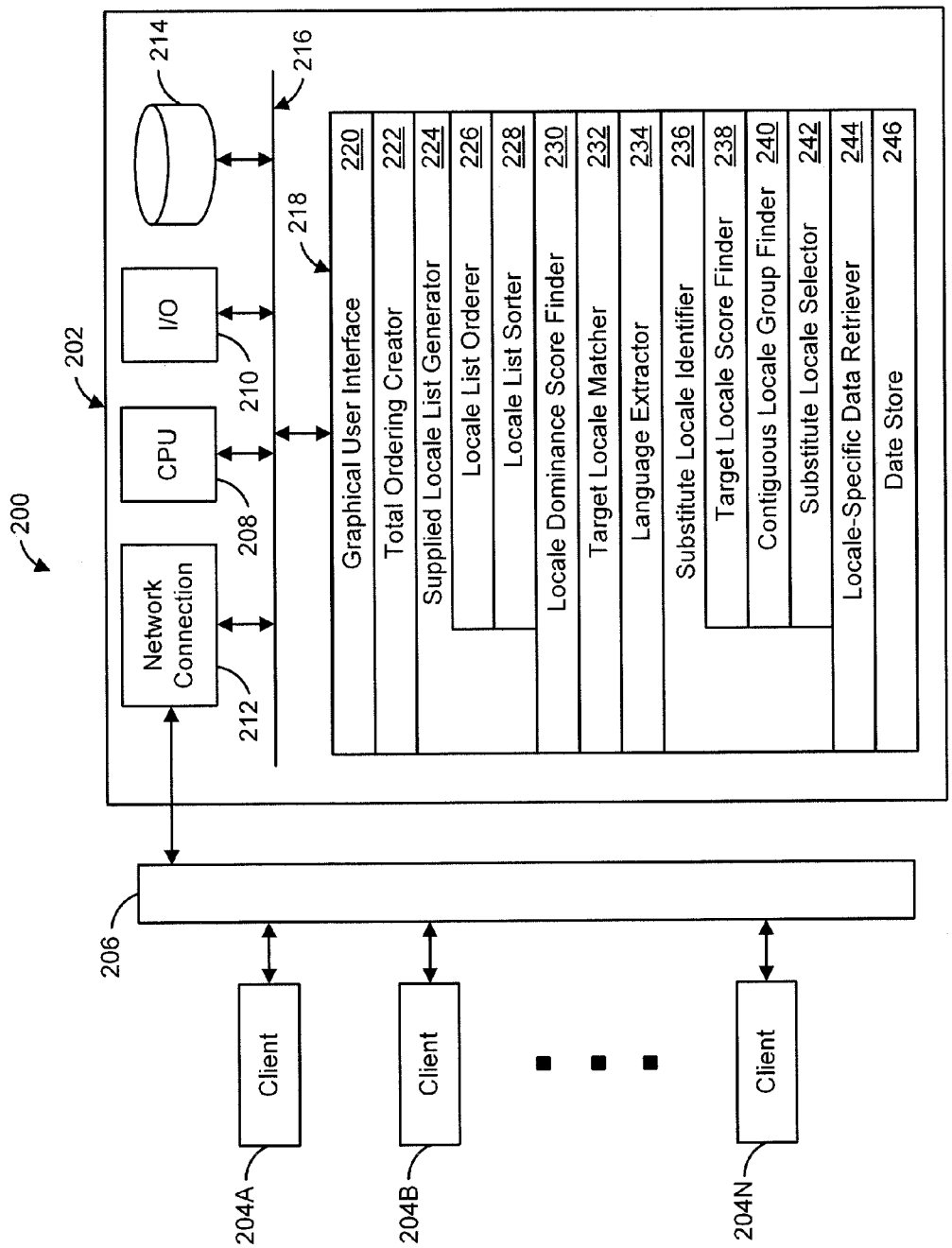
FIG. 2 illustrates a system enabling identification of locale-specific data based on a total ordering of all supported locales, in accordance with one embodiment of the present invention.

FIG. 2 illustrates a system 200 enabling identification of locale-specific data based on a total ordering of all supported locales, in accordance with one embodiment of the present invention. One goal of the system 200 is to eliminate the assumptions of the existence of a country-neutral fallback locale and a grand fallback, so that locale-specific data will be identified if any locale-specific data is available to and supported by the system 200. The system 200 should be designed to identify a reasonable substitute locale from a list of supplied locales including all supported locales for which locale-specific data is available. In one embodiment, the locale-specific data is for a document. It would be advantageous to determine a total ordering of locales that includes any supported locale, so that the computer system can identify, in accordance with the total ordering, the substitute locale. The total ordering should includes locales corresponding to locale-specific data provided to the system 200 in incremental updates. Use of a total ordering of supported locales is important to the identification of the substitute locale, such as if there are multiple versions of the locale-specific data for the document available to and supported by the system 200. For example, the versions may be in different languages.

The system 200 includes a transmission channel 206 connecting a computer 202 with clients 204A-204N. The computer 202 includes standard components, such as a network connection 212, a CPU 208, input/output devices 210, and a data source 214, which communicate over a bus 216. The memory 218 stores a set of executable programs that are used to implement functions of the invention. The clients 204 typically include the same standard components. The data source 214 may be internal and/or external to the computer 202.

In an embodiment of the invention, the memory 218 includes executable instructions establishing the various modules shown in FIG. 2. The graphical user interface module 220 allows the user to interact with the other modules contained in memory 218. The total ordering creator 222 generates a total ordering of all supported locales. The supplied locale list generator 224 generates a list of supplied locales. The generation of the list of supplied locales may be based on the total ordering. The supplied locale list generator 224 may include a locale list orderer 226 and a locale list sorter 228. The locale dominance score finder 230 may determine dominance scores for languages and/or countries, on which the total ordering may be based. The target locale matcher 232 matches a target locale to a locale in the list of supplied locales. The language extractor 234 extracts a language from the target locale in response to the target locale matcher 232 failing to find a match to the target locale in the supplied list of locales. The substitute locale identifier 236 identifies a substitute locale in the supplied list of locales based on the Language extracted by the language extractor 234 and the total ordering. The substitute locale identifier 236 may include a target locale score finder 238, a contiguous locale group finder 240, and a substitute locale selector 242. The locale-specific data retriever 244 may retrieve locale-specific data corresponding to the substitute locale identified by the substitute locale identifier 236. The data store module 246 may read data from and write data to memory 218 or to data source 214.

The modules in memory 218 are exemplary. The function of individual modules may be combined. In addition, the modules may be distributed across a network. It is the processing associated with the invention that is significant, not where or how the processing is implemented.

Figure 3:
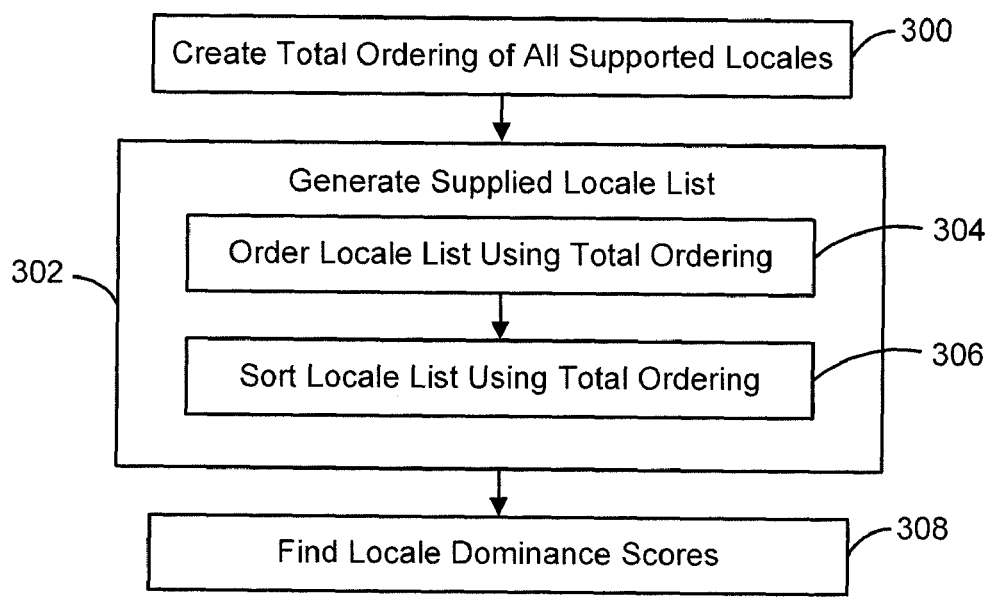
FIG. 3 illustrates operations associated with generating the list of supplied locales based on the total ordering of all supported locales, in accordance with one embodiment of the present invention.

FIG. 3 illustrates operations associated with generating the list of supplied locales based on the total ordering of all supported locales, in accordance with one embodiment of the present invention. The total ordering creator 222 creates a total ordering of all supported locales that is ordered based on supported languages, and supported countries within each supported language (block 300). The supplied locale list generator 224 may optionally use the total ordering to generate a list of supplied locales (block 302).

Total ordering is important to ensure that locale-specific data is retrieved by the system 200 in response to a request, so long as the locale-specific data is available. A totally ordered set has the property that when any two elements of the set are compared, they are never equal. A first example of a totally ordered set is letters of the alphabet ordered by the standard dictionary order, such as A<B<C. Other examples of totally ordered sets are sets of real numbers, natural numbers, integers, and rational numbers, as each can be ordered by the usual less than (<) or greater than (>) relations. When selecting from a totally ordered set, the ordering is taken into account. In one embodiment, a first element of the totally ordered set preceding a second element may be preferred. In an alternative embodiment, the second element may be preferred because it follows the first element.

A supplied locale list includes all supported locales for which locale-specific data is available. In one embodiment, each supplied locale may be associated with locale-specific data for a document that has been supplied to the system 200. The document may be supplied to the system 200 by, for example, a user of the system 200, an author of the document, or a translator of the document.

The list of supplied locales may be ordered based on a total ordering of all supported locales that is ordered based on supported languages, and supported countries within each supported language. In one embodiment, the total ordering may be represented by a hierarchy of all supported locales that pre-exists the generation of the list of supplied locales. However, there is no requirement that the list of supplied locales be ordered based on the total ordering, so long as identification of a substitute locale is based on the total ordering. Each supported language and supported country may be recognized by executable programs in the memory 218 of the system 200. For example, for a language to be supported by the system 200, the character set encoding and font packages associated with the language should be installed on the system 200.

The total ordering of all supported locales is ordered based on supported languages, and supported countries within each supported language. The total ordering may be based on user preferences. For example, a user of the system 200 who is a native of Germany may have an order of language preference for viewing the document of German, Italian, and English. The total ordering based on the preferences of this user would also be German, Italian, and English, assuming that all of these are supported languages. The total ordering may be ordered so that locales including a common supported language are ordered in one or more contiguous locale groups. The user may prefer German as used in Germany (locale German-Germany) to German as used in Austria (locale German-Austria). These localizations of German may be ordered consecutively in a first contiguous locale group, followed by localizations of Italian in a second contiguous locale group, followed by localizations of English in a third contiguous locale group.

The contiguous locale groups may be ranked based on language dominance. Language dominance may be based on at least one of random values, user preferences, total speakers of each language, and default settings of the system 200. Each contiguous locale group may rank the supported countries of the locales in the group based on country dominance. Country dominance may be based on at least one of random values, user preferences, population, gross domestic product, and default settings of the system 200.

The decoupling of the ordering of languages from the ordering of countries within each language facilitates the determination of the total ordering of supported locales as preferences change, such as from one user to the next. The ranking of languages and of countries within each language facilitates the efficient identification of a dominant language and a dominant country within the dominant language.

In this embodiment, the creation of the total ordering (block 300) also pre-exists the generation of the list of supplied locales (block 302). The list of supplied locales for a document may be sorted based on the total ordering of all supported locales. In one embodiment, the locale list orderer 226 may order the list of locales by contiguous locale group using the total ordering (block 304). The locale list sorter 228 may then sort each of the contiguous locale groups in the list of locales using the total ordering (block 306). The sorting of a contiguous locale group may be based only on the country of each locale in the group, or may be based on other information that may be available for each locale in the group, such as the region of the country.

The generation of the list of supplied locales (block 302) may be performed each time additional locale-specific information is provided to the system 200. This enables incremental updates to the list of supplied locales.

The locale dominance score finder 230 may find locale dominance scores for each of the contiguous locale groups (block 308). There may be a distinct range of locale dominance scores for each contiguous locale group, so that the range of locale dominance scores for a first contiguous locale group does not overlap with the range of locale dominance scores for a second contiguous locale group. There may also be a distinct dominance score for each locale within a contiguous locale group. In one embodiment, the range of locale dominance scores for a contiguous locale group may be determined to include ordinal numbers, or identifiers, for each locale within the contiguous locale group. The ordinal numbers for the locales in a contiguous locale group may be consecutive integers, where each locale within the contiguous locale group is assigned a distinct ordinal number.

Figure 4:
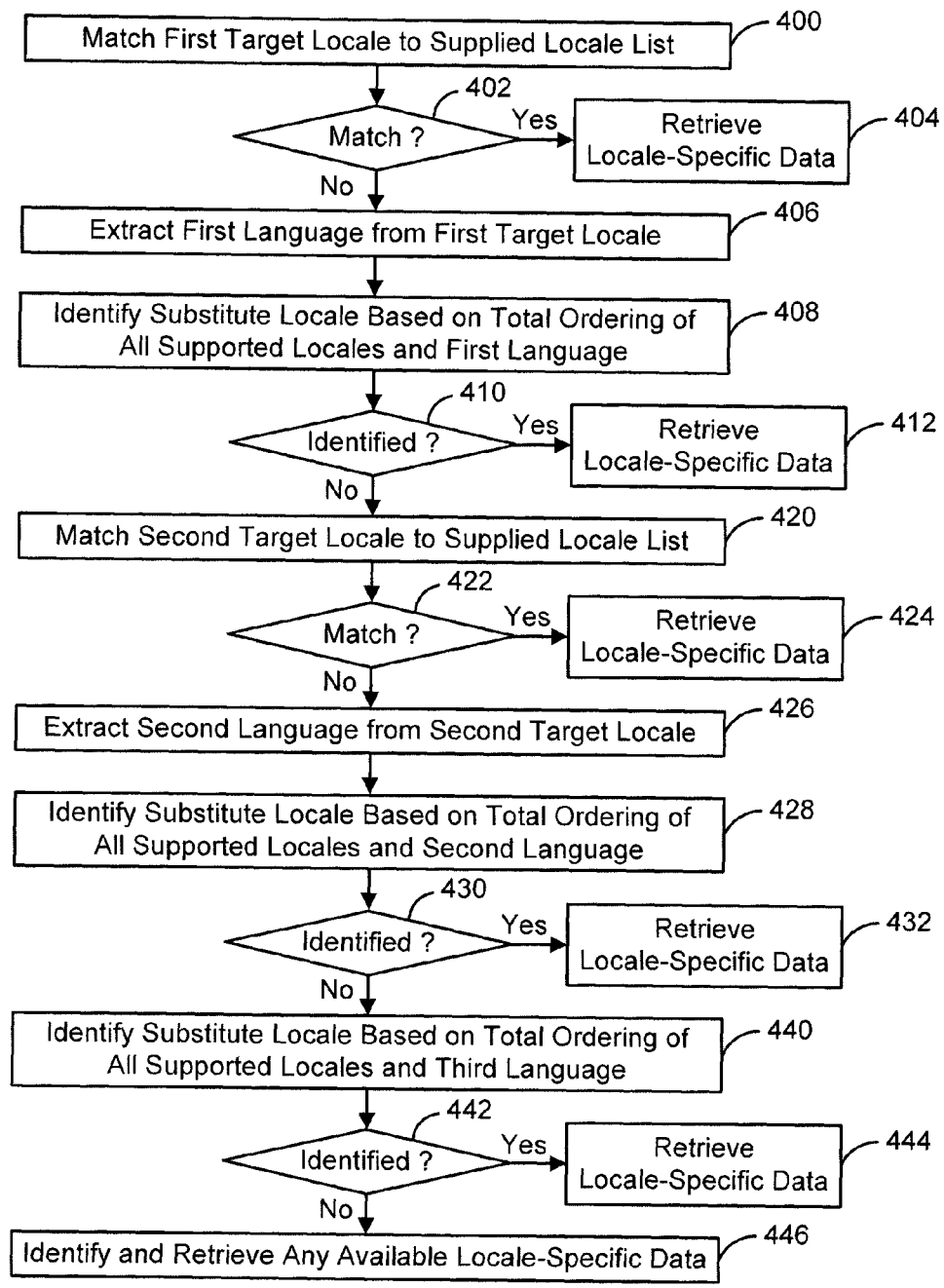
FIG. 4 illustrates operations associated with identifying locale-specific data based on the total ordering of all supported locales, in accordance with one embodiment of the present invention.

FIG. 4 illustrates operations associated with identifying locale-specific data based on the total ordering of all supported locales, in accordance with one embodiment of the present invention. The target locale matcher 232 matches a first target locale to the list of supplied locales (block 400). The first target locale may be provided by a user of the system 200 via the graphical user interface 220 as a user preference. In one embodiment, the matching (block 400) may be in response to a query of the data source 214 via the data store module 246, such as a Structured Query Language (SQL) query of an object-oriented database.

Matching may be based on one or more tags associated with a target locale. In one embodiment, the matching (block 400) of the first target locale to the list of supplied locales is based on the language of the first target locale, and may also be based on one or more of script, dialect, country, region of the country, and time. Time may refer to the time that the document was written. If there is a match (block 402), then the locale-specific data retriever 244 retrieves locale-specific data corresponding to the target locale (block 404). In one embodiment, locale-specific data may be a localized string.

If there is no match, then the language extractor 234 extracts a first language from the first target locale (block 406). In this embodiment, the substitute locale identifier 236 then attempts to identify a substitute locale within the list of supplied locales based on the total ordering of all supported locales and the first language (block 408). For example, if a British user requests a British English version of a presentation that is available only in Australian English and Singaporean English, the language extractor 234 extracts English from the target locale English-Britain. The substitute locale identifier 236 then matches the language English to the list of supplied locales for the presentation to obtain all locales in the list of supplied locales with a language of English, which in this case are English-Australia and English-Singapore. The substitute locale identifier 236 then may select the substitute locale based on the country (Australia or Singapore) that is dominant based on the total ordering of all supported locales. This illustrates that the substitute locale will include the extracted language English if the list of supplied locales includes at least one locale with English as its language. This also enables a reasonable substitute locale with corresponding locale-specific data to be identified from a list of supplied locales without requiring the system 200 to have a country-neutral English translation of the document.

Also, in one embodiment, if a British English version of the presentation is provided to the system 200, the British user will be provided the requested British English version of the presentation shortly after the list of supplied locales is incrementally updated with the English-Britain locale based on a pre-existing total ordering.

If a locale is identified within the list of supplied locales (block 410), then the locale-specific data retriever 244 retrieves locale-specific data corresponding to the substitute locale (block 412). In one embodiment, an identified locale (block 410) includes the extracted language (block 406). If there is no locale in the list of supplied locales that includes the extracted language, then the first round of matching (blocks 400-412) ends and a second round of matching (blocks 420-432) begins. In this embodiment, the goal of the first round of matching is to attempt to satisfy a locale preference indicated by a user of the system 200. The goal of the second round of matching is to attempt to satisfy another relevant locale preference. The second round of matching includes similar operations to the first round of matching, except that the second round of matching is based on a second target locale. In this embodiment, the second target locale may be associated with at least one of a document, a report, a site, a group, and a division. For example, the second target locale may be the preferred locale of the document author, or may be the preferred locale of a division of a company that has employees in several different countries.

In another embodiment, if there is no locale in the list of supplied locales that includes the extracted language, then a substitute locale including a different language is identified and the corresponding locale-specific data retrieved. This substitute locale may be the locale in the list of supplied locales with the highest locale dominance score. In this embodiment, a substitute locale is always identified if there is any locale in the list of supplied locales, without requiring a second round of matching.

In another embodiment, the language extractor 234 may extract a subset of tags including multiple tags from the first target locale. For example, the matching of the first target locale to the list of supplied locales may be based on language, country, and region. The language extractor 234 may extract both language and country from the first target locale, and the substitute locale identifier 236 may then attempt to identify a substitute locale within the list of supplied locales based on both the language and the country. If no locale is identified, then rather than ending the first round of matching, the language extractor 234 may extract just the language from the first target locale, and the substitute locale identifier 236 may then attempt to identify a substitute locale within the list of supplied locales based on just the language.

In the embodiment of FIG. 4, if no substitute locale is identified based on the second language and the total ordering of all supported locales, then a third round of matching (blocks 440-446) begins. In one embodiment, the goal of the third round of matching is to attempt to satisfy a locale preference of the system 200. There is no system default locale. Rather, the substitute locale identifier 236 attempts to identify a substitute locale within the list of supplied locales based on a third language, which may be English, and based on the totally ordering of all supported locales (block 440). As in blocks 410 and 430, if a locale is identified within the list of supplied locales (block 442), then the locale-specific data retriever 244 retrieves locale-specific data corresponding to the substitute locale (block 444). If no locale is identified within the list of supplied locales, then the locale-specific data retriever 244 identifies and retrieves any available locale-specific data (block 446). This enables locale-specific data to be returned for a document if any locale-specific data for the document is available to and supported by the system 200. This also removes the burden on a user to provide, for example, a US English translation of a non-US English language document so that a system default locale of English-US can be populated.

Figure 5:
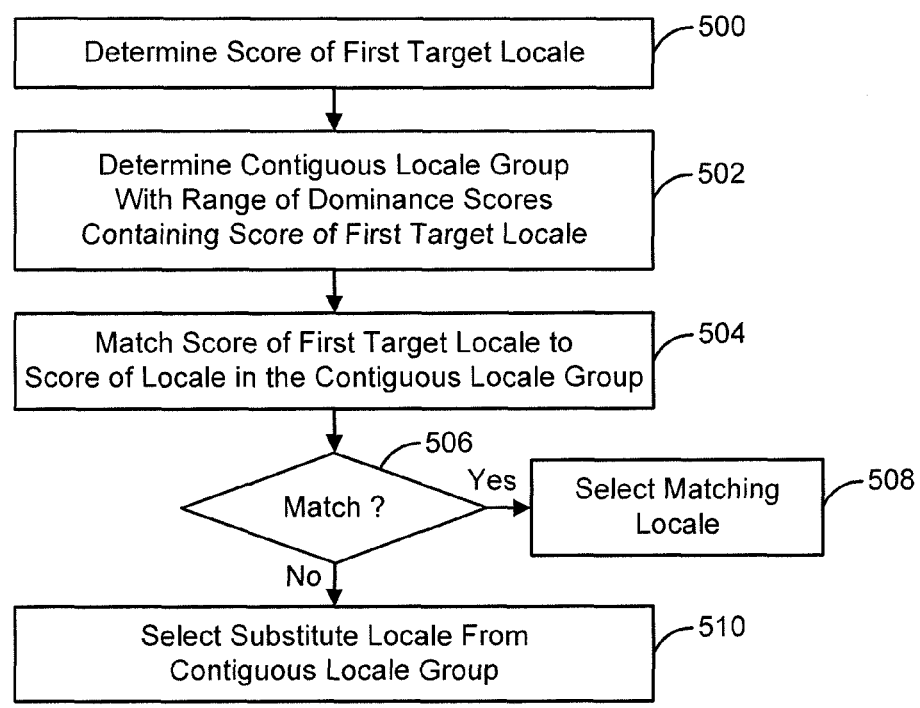
FIG. 5 illustrates operations associated with identifying the substitute locale within the list of supplied locales, in accordance with one embodiment of the present invention.

FIG. 5 illustrates operations associated with identifying the substitute locale within the list of supplied locales, in accordance with one embodiment of the present invention. The target locale score finder 238 of the substitute locale identifier 236 may determine a score for a first target locale (block 500). In one embodiment, the score for the first target locale may be based on a language and country associated with the first target locale. For example, the score for the first target locale may be set equal to the ordinal number assigned to an element of the total ordering of all supported locales with the same language and country as the first target locale.

The contiguous locale group finder 240 of the substitute locale identifier 236 may then determine a contiguous locale group with a range of dominance scores containing the score of the first target locale (lock 502). In one embodiment, the contiguous locale group finder 240 may compare the score of the first target locale to a stored list with the range of dominance scores for the contiguous locale group, where the range of dominance scores is based on the language associated with the contiguous locale group.

The target local matcher 232 then attempts to match the score of the first target locale to the score of a locale in the contiguous locale group found in block 502 (block 504). If there is a match (block 506), then the target locale matcher 232 selects the locale in the contiguous locale group with the same score as the first target locale (block 508). If there is no match, the substitute locale selector 242 selects the dominant locale of the contiguous locale group containing the score of the first target locale (block 510).

The operations of blocks 504 and 510 may be achieved by parsing a binary search tree of locales to find a locale in the list of supplied locales, or may be achieved in any other computationally efficient way known in the art.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium for identifying locale-specific data, comprising executable instructions to:
    extract, from at least one document, a first language from a first target locale including the first language and a first country in response to failing to find a locale including the first language and the first country in a list of supplied locales, the list of supplied locales including all supported locales for which locale-specific data is available; and
    identify a substitute locale within the list of supplied locales based on a total ordering of supported locales derived from locale dominance scores, such that any two elements in the total ordering are never equal, the substitute locale including the first language and a second country and being distinct from both a country-neutral locale including the first language and a default locale;
    wherein:
    the list of supplied locales is ordered using the total ordering such that any supplied locales including a common supported language are ordered in at least one contiguous locale group, the total ordering being based on a first ranking of all supported languages based on a language dominance score, wherein the language dominance score being based on a total number of speakers of each language;
    each of the at least one contiguous locale group is sorted using the total ordering, wherein the total ordering is based on a second ranking of all supported countries associated with each supported language based on a country dominance score, wherein the country dominance score being based on at least one of population and gross domestic product.

2. The non-transitory computer readable storage medium of claim 1, wherein the substitute locale is a dominant locale including the first language and a dominant country of the first language.

3. The non-transitory computer readable storage medium of claim 1, further comprising executable instructions to match the first target locale to the list of supplied locales based on the first language, the first country, and at least one of script, dialect, region, and time.

4. The non-transitory computer readable storage medium of claim 3, wherein the executable instructions to match are in response to a Structured Query Language (SQL) query of an object-oriented database.

5. The non-transitory computer readable storage medium of claim 1, wherein the first target locale is a user preference.

6. The non-transitory computer readable storage medium of claim 1, further comprising executable instructions to retrieve the locale-specific data corresponding to the substitute locale.

7. The non-transitory computer readable storage medium of claim 6, wherein the locale-specific data is a localized string.

8. The non-transitory computer readable storage medium of claim 1, further comprising executable instructions to match a second target locale to the list of supplied locales based on a second language and at least one of script, dialect, country, region, and time, in response to failing to identify the substitute locale including the first language.

9. The non-transitory computer readable storage medium of claim 8, further comprising executable instructions to:
    extract the second language from the second target locale in response to failing to match the second target locale to the list of supplied locales; and
    identify the substitute locale within the list of supplied locales based on the total ordering of all of the supported locales, wherein the substitute locale includes the second language in response to the list of supplied locales includes at least one locale with the second language.

10. The non-transitory computer readable storage medium of claim 9, wherein the second target locale is a locale associated with at least one of a document, a report, a site, a group, and a division.

11. The non-transitory computer readable storage medium of claim 9, further comprising executable instructions to retrieve the locale-specific data for the document in a third language in response to failing to identify the substitute locale including the second language.

12. The non-transitory computer readable storage medium of claim 1, wherein the executable instructions to sort are also based on a region of a country.

13. The non-transitory computer readable storage medium of claim 1, further comprising executable instructions to determine a distinct range of dominance scores for each of the at least one contiguous locale group, and a distinct dominance score for each locale within each of the at least one contiguous locale group.

14. The non-transitory computer readable storage medium of claim 13, wherein the executable instructions to identify further comprise executable instructions to:
    determine a score of the first target locale;
    determine a contiguous locale group with a range of dominance scores containing the score of the first target locale; and
    select the substitute locale from the contiguous locale group based on distinct dominance score for each locale within the contiguous locale group.

15. The non-transitory computer readable storage medium of claim 14, wherein the score of the first target locale is based on the first language and the first country associated with the first target locale, and the distinct dominance score for each locale within each of the at least one contiguous locale group is based on a language and a country associated with each locale within each of the at least one contiguous locale group.

16. The non-transitory computer readable storage medium of claim 14, wherein the executable instructions to select include executable instructions to parse a binary search tree of locales.

17. The non-transitory computer readable storage medium of claim 1, wherein the executable instructions to identify further comprise executable instructions to:
    match the first language to the list of supplied locales to obtain a locale including the first language and the second country; and
    select the locale including the first language and the second country as the substitute locale.

18. A method for implementation by one or more computer processors for identifying locale-specific data comprising:
    extracting, by the one or more computer processors from at least one document, a first language from a first target locale including the first language and a first country in response to failing to find a locale including the first language and the first country in a list of supplied locales, the list of supplied locales including all supported locales for which locale-specific data is available; and identifying, the one or more computer processors, a substitute locale within the list of supplied locales based on a total ordering of supported locales derived from locale dominance scores, such that any two elements in the total ordering are never equal, the substitute locale including the first language and a second country and being distinct from both a country-neutral locale including the first language and a default locale;

wherein:

the list of supplied locales is ordered using the total ordering such that any supplied locales including a common supported language are ordered in at least one contiguous locale group, the total ordering being based on a first ranking of all supported languages based on a language dominance score, wherein the language dominance score being based on a number of total speakers of each language;

each of the at least one contiguous locale group is sorted using the total ordering, wherein the total ordering is based on a second ranking of all supported countries associated with each supported language based on a country dominance score, wherein the country dominance being based on at least one of population, and gross domestic product.

19. A system for identifying locale-specific data comprising:

one or more computer processors;

memory coupled to the one or more computer processors storing instructions, when executed, result in operations comprising:

extracting, by the one or more computer processors from at least one document, a first language from a first target locale including the first language and a first country in response to failing to find a locale including the first language and the first country in a list of supplied locales, wherein the list of supplied locales includes all supported locales for which locale-specific data is available; and identifying, by the one or more computer processors, a substitute locale within the list of supplied locales based on a total ordering of supported locales derived from locale dominance scores, such that any two elements in the total ordering are never equal, the substitute locale including the first language and a second country and being distinct from both a country-neutral locale including the first language and a default locale;

wherein:

the list of supplied locales is order using the total ordering such that any supplied locales including a common supported language are ordered in at least one contiguous locale group, the total ordering being based on a first ranking of all supported languages based on a language dominance score, wherein the language dominance score being based on a total number of speakers of each language;

each of the at least one contiguous locale group is sorted using the total ordering, wherein the total ordering is based on a second ranking of all supported countries associated with each supported language based on a country dominance score, wherein the country dominance score being based on at least one of population and gross domestic product.

\* \* \* \* \*